United States Patent Office 2,880,244
Patented Mar. 31, 1959

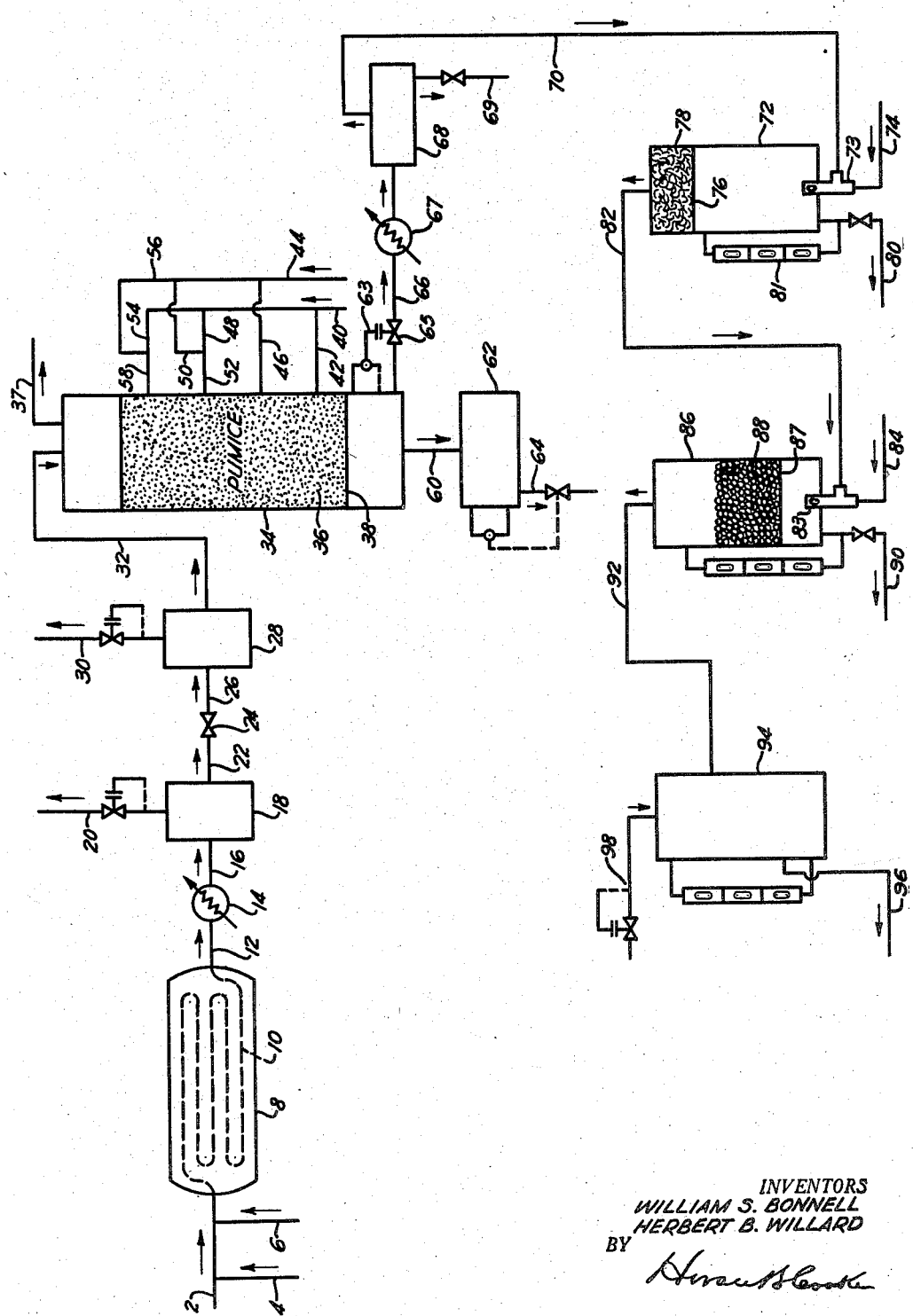

2,880,244

PROCESS OF PREPARING PURIFIED OXO PRODUCT AND PRODUCTION OF ALCOHOLS

William S. Bonnell and Herbert B. Willard, Port Arthur, Tex., assignors to Gulf Oil Corporation, Pittsburgh, Pa., a corporation of Pennsylvania Application October 25, 1955, Serial No. 542,692

2 Claims. (Cl. 260—638)

This invention relates to a process for the production of aldehydes and/or alcohols by the reaction between synthesis gas comprising hydrogen and carbon monoxide and an olefin or olefins to produce a hydroformylation reaction product containing aldehydes, which aldehydes are then preferably hydrogenated to the corresponding alcohols. This invention relates more particularly to a method of treating the hydroformylation reaction product prior to hydrogenation.

The process for the manufacture of alcohols from an olefin or olefins and a synthesis gas comprising hydrogen and carbon monoxide is generally known as the Oxo process. In the first stage of the process, sometimes referred to as the hydroformylation stage, an organic compound containing olefinic linkages is reacted with a synthesis gas comprising hydrogen and carbon monoxide at an elevated temperature and an elevated pressure in the presence of a catalyst containing metals of the iron group, such as nickel, cobalt or iron, to produce a hydroformylation product comprising predominantly aldehydes containing one more carbon atom than the reacted olefins, as well as some alcohols, acids, aldols, acetals, unreacted constituents, namely hydrogen, carbon monoxide and olefins, and the hydroformylation catalyst in the form of a dissolved metal carbonyl. The hydroformylation reaction product is subsequently treated in a second stage to decompose and remove the catalytic metal, after which the demetalled hydroformylation reaction product is passed to the hydrogenation stage where the aldehydes are hydrogenated in the presence of a hydrogenation catalyst to obtain a product consisting predominantly of the corresponding alcohols. The alcohol is removed from the latter product by any conventional means, preferably by distillation.

As noted, the hydroformylation reaction product comprises predominantly aldehydes, some alcohols, acids, aldols, acetals unreacted constituents, namely hydrogen, carbon monoxide and olefins, and the hydroformylation catalyst in the form of a dissolved metal carbonyl. In addition, relatively small amounts of other metallic carbonyls, particularly iron carbonyl, are also present. These metal carbonyls are generally formed from the reaction of carbon monoxide employed with the walls of the reactor, transfer lines, or impurities in the feed.

The organic acids or acid materials present in the hydroformylation reaction mixture are undesirable since they increase the acidity and saponification number of the aldehyde and alcohol product. The acids are more difficult to hydrogenate than the aldehydes and they are corrosive. Their removal results in less corrosion of the equipment employed, improved alcohol yield and quality and increased hydrogenation catalyst life.

There are two sources of organic acid and other acidic material: from the hydroformylation catalyst used and from the Oxo reaction itself. Thus, when such catalysts as cobalt 2-ethylhexanoate or cobalt naphthenate are used, they are converted to cobalt carbonyl in the hydroformylation reaction zone and 2-ethylhexanoic acid and naphthenic acid, respectively, are formed. In addition, organic acids such as formic acid are also believed to be formed as a result of the reactions occurring in the hydroformylation reaction zone.

We have found that the acid number and the saponification number of the aldehyde and alcohol produced in the Oxo process can be reduced, corrosion of equipment reduced and hydrogenation catalyst life extended by contacting the substantially complete demetalled hydroformylation reaction product with a weak alkaline treating agent at a relatively low temperature prior to hydrogenation. Undesirable polymerization of aldehydes and formation of alcoholates under such conditions are virtually eliminated.

In order that the invention may be understood more fully, reference should be had to the accompanying drawing, the single figure of which is a diagrammatic flow sheet showning a typical method of carrying out a preferred embodiment of our invention for the production of alcohols using as raw materials synthesis gas and olefins. In the drawing the showing of some flow devices has been omitted in the interest of clarity. The drawing is hereby incorporated in and made a part of this specification.

Synthesis gas containing hydrogen and carbon monoxide in a molar ratio of about one to one at an elevated pressure of about 1500 to about 5000 pounds per square inch, preferably about 3500 pounds per square inch, is flowed through line 2, where it is joined by an olefin or olefins in line 4 and the hydroformylation catalyst in line 6. The mixture is then passed to hydroformylation reaction zone 8, which is preferably in the form of an elongated coil reactor 10. In order to remove the exothermic heat of the hydroformylation reaction, and maintain the desired temperature of reaction, the coil 10 is preferably immersed in a bath of cooling water. The olefin may be any suitable straight or branch chained olefins having from 3 to 18 carbon atoms, such as propylene or heptene, or olefin polymers such as tripropylene and tetrapropylene, and the catalyst is preferably a cobalt salt of any suitable organic acid such as a fatty acid, preferably one containing at least 6 carbon atoms, or a naphthenic acid. Preferred salts are cobalt 2-ethylhexanoate and cobalt naphthenate. In general the catalyst should be introduced in an amount corresponding to about one atomic proportion of cobalt for each 600 mols of olefins, while about one mol of olefin should be used for each mol of hydrogen and carbon monoxide. Coil reactor 10 is preferably operated at a pressure of about 1500 to about 5000 pounds per square inch and a temperature of about 260° to about 460° F., depending upon the feed rate and other reaction conditions.

Liquid hydroformylation reaction product comprising predominantly aldehydes containing one more carbon atom than the reacted olefins, some alcohols, aldols, acetals, unreacted constituents, namely hydrogen, carbon monoxide and olefins, the hydroformylation catalyst in the form of a dissolved metal carbonyl, such as cobalt carbonyl, iron carbonyl, 2-ethylhexanoic acid or naphthenic acid, and formic acid, is removed from coil reactor 10 and transferred by line 12 to cooler 14, where the hydroformylation reaction product is cooled to a suitably low temperature, such as about 110° F. and then passed through line 16 to high pressure separator 18. In high pressure separator 18, a gas phase synthesis gas and traces of vapors of metal carbonyls and organic compounds are separated from a liquid phase comprising the remainder of the hydroformylation reaction product. The gas phase is removed through a pressure regulating valve in line 20 and vented from the system. If desired the gas phase removed by line 20 can be recycled to the hydroformylation stage.

The liquid hydroformylation reaction product at a pressure of about 3500 pounds per square inch and a temperature of about 100° F. is then passed by line 22 through valve 24 and line 26 to the low pressure separator 28. In separator 28 a gas phase containing unreacted gas and traces of vapors of metal carbonyls and organic compounds at the low pressure are separated from a liquid phase comprising the remainder of the hydroformylation reaction product including small amounts of carbon monoxide and hydrogen which are dissolved in the hydroformylation reaction product under the conditions of separation. The gas phase is removed by line 30 and can also be recycled to the hydroformylation reaction zone if desired.

The liquid hydroformylation reaction product is removed from the low pressure separator 28 and passed by line 32 downwardly into demetalling tower 34. Low pressure separator 28 and demetalling tower 34 operate at about 300 and 250 pounds per square inch, respectively. An additional demetalling tower which can be used concurrently with or alternately with demetalling tower 34 can also be employed if desired. The tower 34 is substantially filled with pumice 36 which is held in place by a grid 38 mounted adjacent the bottom thereof. Saturated steam at a pressure of about 450 pounds per square inch gauge and a temperature of about 460° F. is introduced by lines 40 and 42 to a point near the bottom of demetalling tower 34 above grid 38. A gas such as hydrogen is introduced by lines 44 and 46 to demetalling tower 34 at a point above the point where the steam is initially introduced. Additional steam is introduced by lines 40 and 48 and additional hydrogen by lines 44 and 50. The resulting mixture is introduced by line 52 into demetalling tower 34 above the point where the gas is initially introduced by means of line 46. In like manner, steam is passed by lines 40 and 54 and hydrogen by lines 44 and 56. The resulting mixture is introduced by line 58 into demetalling tower 34 at a point above the point where the mixture of steam and hydrogen is introduced by line 52.

In the demetalling tower the liquid hydroformylation reaction product is heated from an initial temperature of about 100° F. at which it enters the demetalling tower to a final temperature of about 340° to about 420° F. A temperature gradient is established along the vertical length of the demetalling tower 34, with the temperature adjacent the bottom being about 340° to about 420° F. and the temperature adjacent the top being about 100° F. Below the top of the demetalling tower but in the upper portion thereof, the hydroformylation reaction product is heated to a temperature of about 165° to about 212° F., which is sufficiently high to decompose substantially completely the cobalt carbonyl on the pumice in the upper part of the demetalling tower, while in the lower portion above grid 38 the hydroformylation reaction product is heated to a temperature of about 340° to about 420° F., and iron and other alloying metal carbonyls are decomposed with the consequent deposition of the free metals upon the pumice in the lower portion of the demetalling tower. The deposition of cobalt and iron resulting from the decomposition of the corresponding carbonyls on the pumice is substantially complete. The coated pumice can be removed periodically from the demetalling tower and replaced if desired. Carbon monoxide resulting from the decomposition of the metal carbonyls and hydrogen are removed overhead by line 37.

The hydroformylation reaction product, though substantially free of dissolved metals, such as cobalt and iron carbonyls, is admixed with water resulting from condensation of the steam introduced into demetalling tower 34. The water contains some dissolved metal carbonyls or other metal salts and some pulverized or finely divided pumice or other solid materials. Since these materials may be detrimental to the subsequent Oxo reactions, it is important that they be removed from admixture with the hydroformylation reaction mixture. This is done by removing the water carrying the impurities from the hydroformylation reaction product. The lower portion of the demetalling tower 34 below grid 38 serves as a liquid reservoir and a liquid level is held in this section by level controller 63 and regulator 65. The mixture of hydroformylation reaction product and water separates into two layers, with the water forming the lower layer. The water finds its way through line 60 into the bottom of separator 62 where it is withdrawn through line 64. The upper part of the mixture comprising essentially the remainder of the hydroformylation reaction product is found in the lower portion of demetalling tower 34, line 60 and the upper part of separator 62. The purpose of this design is to settle the water at the same pressure and temperature that exists in the bottom of the demetalling tower, thus minimizing emulsion troubles. The hydroformylation reaction product containing some water in solution and some free water is removed from the side of demetalling tower 34 by line 66 and passed through cooler 67. The product thus cooled to about 100° F., is then passed through an Excelso type filter 68 where most of the free water remaining in the hydroformylation reaction product is continuously removed by line 69.

The cobalt content of the demetalled hydroformylation reaction product which leaves filter 68 by way of line 70 is usually less than about 0.1 milligram per liter while the iron content is usually less than about 0.4 milligram per liter.

The hydroformylation reaction product is then passed by line 70 to vessel 72 for treatment in accordance with the present invention. At the entry line into vessel 72 an aqueous solution of an alkaline reagent from line 74 is added continuously to the hydroformylation reaction product. If desired, the hydroformylation reaction product and the alkaline reagent can be passed separately into vessel 72.

In one specific application we have added 16 gallons per day of 34 Bé. caustic to 135 barrels per day of hydroformylation reaction product entering vessel 72. The mixture was dispersed through nozzle 73 which consists of a bull end of a pipe with holes drilled in the side. A level of weak caustic is held midway in vessel 72 by means of glass 81. Caustic solution is withdrawn by way of line 80 to hold the desired level. The caustic solution strength is 0.5 to 1.5 percent due to dilution with water in solution and any unseparated free water in the hydroformylation reaction product.

Suitable alkaline media which can be employed include sodium hydroxide, potassium hydroxide, calcium hydroxide, etc., with sodium hydroxide being preferred. The concentration of the alkaline reagent employed in the treater or vessel 72 such as sodium hydroxide, should be about 0.2 to about 3.0 percent, preferably about 0.5 to about 1.5 percent. The concentration of the alkaline reagent employed is extremely important, for if the concentration is in excess of about 3.0 percent the tendency of the alkaline reagent to act as catalyst for the aldol condensation action and to form alcoholates would be increased. At the rates and strengths specified, the caustic height in vessel 72 is about 2 feet 6 inches. The temperature is preferably low and can be about 70° to about 150° F. The pressure employed is that necessary to force the caustic through the liquid. A pressure of about 5 to about 100 pounds per square inch is satisfactory for such purpose. The residence time of the reactants in vessel 72 is preferably low, from about one second to about 2 minutes. In this way the organic acids present in the hydroformylation reaction product react with the alkaline reagent present to form the corresponding salts of the acids. The acid number and the saponification number of the hydroformylation reaction product is reduced and the corrosion of metal equipment is thereby virtually eliminated.

In the top of vessel 72 is mounted a grid 76 upon which is placed a fine mesh material such as glass fibers 78 or the like. The hydroformylation reaction product containing entrained alkaline reagent contacts the fine mesh material as it leaves vessel 72. The alkaline reagent upon contact with the fine mesh material coalesces and drops back into the weak caustic solution.

The treated hydroformylation reaction product is removed overhead from vessel 72 by line 82 and joined with from about 5 to about 10 percent by volume of water from line 84 at the entry to the vessel. The resulting mixture is flowed into water wash vessel 86 wherein the remaining water soluble constituents in the hydroformylation reaction product such as alkaline reagent not previously removed in vessel 72 are removed. The mixture of water and caustic washed reaction product enters vessel 86 through a distributor 83 similar to that in vessel 72. Vessel 86 is filled half-way with a bed of one-half inch diameter clay balls 88 supported by grid 87. A water level of 2 feet is maintained in the bed by withdrawing water continuously from the base of vessel 86 by line 90. The treated hydroformylation reaction product is removed by line 92. If desired one or more additional water wash drums can be used in order to further wash the treated hydroformylation reaction product.

The treated hydroformylation reaction product comprising substantially aldehydes and substantially free of organic acids or acidic materials, metals and water is passed by line 92 to accumulator 94. A natural gas pressure of about 40 pounds per square inch is maintained on the accumulator by regulator and line 98. From this accumulator the treated hydroformylation reaction product is charged through line 96 to the hydrogenation system (not shown) wherein the aldehydes are hydrogenated to the corresponding alcohols in the presence of hydrogen and a suitable hydrogenation catalyst such as nickel, copper chromite, etc., at a pressure of about 500 to about 1200 pounds per square inch and a temperature of about 340 to about 420° F. The alcohol product is removed from the hydrogenation reactor for further processing, for example to a distillation unit where the alcohol produced is recovered.

The advantages of our invention are illustrated as follows. A mixture of 6 barrels per hour of heptene, 2¾ gallons per hour of cobalt octanoate catalyst in naphtha representing 6 percent by weight of cobalt as such, and 17,000 standard cubic feet per hour of synthesis gas containing equal molar proportions of hydrogen and carbon monoxide is reacted at a temperature of about 335° F. and a pressure of about 3500 pounds per square inch to produce a hydroformylation reaction product comprising a major amount of isooctyl aldehyde. The hydroformylation reaction product enters the demetalling zone containing pumice as packing at a temperature of about 100° F., and as it progresses downwardly through the demetalling zone, its temperature is increased with steam to about 360° F. The pressure is maintained at about 250 pounds per square inch. Under these conditions, the metal carbonyls comprising cobalt carbonyl and iron carbonyl are decomposed to form the elemental metals and carbon monoxide with the metals depositing on the pumice.

The demetalled product is divided into two parts. One part is hydrogenated in the presence of hydrogen and a nickel supported catalyst at a temperature of about 380° F. and a pressure of about 900 pounds per square inch. The second portion is treated with about 0.28 percent by volume of 34 Bé. caustic at a temperature of about 100° F. and atmospheric pressure. After washing the treated hydroformylation reaction product with water, it is similarly hydrogenated using the same hydrogenation conditions as with the first portion. The results obtained are tabulated below:

| | Example I | Example II |
|---|---|---|
| | Demetalled Reaction Product Hydrogenated Without Caustic Treatment | Demetalled Reaction Product Caustic Washed, Water Washed and Hydrogenated |
| A. Demetalled Reaction Product: | | |
| Cobalt, milligrams/liter | 0.10 | 0.10 |
| Iron, milligrams/liter | 0.35 | 0.4 |
| Saponification No. ASTM D-94-52T | 22.5 | 21.3 |
| Neutralization No. ASTM D-664-54 | 3.0 | 1.2 |
| B. Recovered Alcohol: | | |
| Acidity, ASTM D-268-49 | 0.002 | 0.001 |
| Saponification No. ASTM D-94-52T | 0.8 | 0.2 |
| C. Iron Content, Milligrams/liter: | | |
| Hydrogenated Product | 0.44 | 0.14 |
| Water from Hydrogenated Product Separator | 69.8 | 8.4 |

The above data clearly demonstrate the removal of organic acids from the demetalled hydroformylation reaction product. The reduction in acidity and saponification number of the recovered alcohol improved the quality of the alcohol produced and thus permitted an increase in overall yield of alcohol. The reduction in iron content of the hydrogenated product demonstrates the reduction in corrosion of the iron equipment employed as a result of the weak caustic wash. This is evidenced in large-scale operation by less leaks due to corrosion, less iron deposited on the hydrogenation catalyst and longer catalyst life.

Obviously many modifications of the invention, as hereinabove set forth, may be made without departing from the spirit and scope thereof, and therefore only such limitations should be imposed as are indicated in the appended claims.

We claim:

1. A method of producing alcohols which comprises reacting an olefin with synthesis gas comprising hydrogen and carbon monoxide in the presence of a cobalt hydroformylation reaction catalyst at a temperature of about 260° to about 460° F. and a pressure of about 1500 to about 5000 pounds per square inch to obtain a hydroformylation reaction product comprising aldehydes, alcohols, dissolved metal carbonyls and acidic material, contacting the hydroformylation reaction product with steam at a temperature sufficiently high to decompose said metal carbonyls and form the free metal thereof and obtain a mixture comprising demetalled hydroformylation reaction product and water, separating water from said latter mixture, contacting the resulting substantially water-free product under non-distillation conditions and a contact time of about one second to about two minutes with an aqueous solution of an alkaline medium selected from the group consisting of sodium hydroxide, potassium hydroxide and calcium hydroxide having a concentration of about 0.2 to about 3 percent at a temperature of about 70° to about 150° F., separating therefrom alkaline medium remaining after such contact, and thereafter hydrogenating the treated hydroformylation reaction product to convert said aldehydes to the corresponding alcohols.

2. The process of claim 1 wherein the alkaline medium is sodium hydroxide.

References Cited in the file of this patent

UNITED STATES PATENTS

| 2,638,487 | Russum et al. | May 12, 1953 |
| 2,679,534 | Koontz | May 25, 1954 |
| 2,688,591 | Hill | Sept. 7, 1954 |
| 2,779,796 | Munger | Jan. 29, 1957 |